United States Patent Office 3,054,699
Patented Sept. 18, 1962

3,054,699
WATER-SOLUBLE LATENT CURING CATALYSTS FOR TEXTILE TREATMENT RESINS
James Albert Moyse, Manchester, England, assignor to Imperial Chemical Industries Limited, London, England, a corporation of Great Britain
No Drawing. Filed June 6, 1958, Ser. No. 740,180
Claims priority, application Great Britain June 12, 1957
4 Claims. (Cl. 117—139.4)

This invention relates to water-soluble latent curing catalysts for textile treatment resins, and to a process for the resin treatment of textile materials with such water-soluble latent curing catalysts.

According to the present invention there is provided a process for the resin treatment of textile materials which comprises treating the textile materials with an aqueous solution containing a resin-forming composition, as hereinafter defined, and a water-soluble halogeno-1:3:5-triazine as the latent curing catalyst.

The resin-forming compositions used in the above process are compositions known from the art or used in practice for the production of textile materials having finishes resistant to creasing or to shrinking or of modified handle. Suitable resin-forming compositions include the methylol derivatives or lower alkyl ethers of methylol derivatives of monomeric or polymeric compounds containing a plurality of amino or monosubstituted amino groups said compounds being known from the art or used in practice for the formation of resins by condensation with formaldehyde. Suitable compounds include, for example, monomeric nitrogen compounds such as urea, thiourea, substituted ureas and thioureas, dicyandiamide, dicyandiamidine, biguanides, amides, carbamates, allophanates and heterocyclic compounds such as aminotriazines, ureins, ureides, imidazolidones, triazones and hydantoins, or mixtures of such compounds, and polymeric nitrogen compounds such as the polymeric amides made by the reaction of dibasic acids with diamines. The lower alkyl ethers of the methylol derivatives of these compounds include for example the methyl, ethyl, propyl and butyl ethers.

The water-soluble halogeno-1:3:5-triazines used as latent curing catalysts in the process of the invention include mono- and di-halogeno-1:3:5-triazines which contain, attached to at least one of the carbon atoms of the triazine ring through a nitrogen, oxygen or sulphur atom, an organic radical carrying either a negatively charged solubilising group, such as a sulphonic or carboxylic group, or a positively charged solubilising group, such as a quaternary ammonium group.

If desired these water-soluble halogeno-1:3:5-triazines containing sulphonic acid and/or carboxylic acid groups may be used in the form of their salts, for example their salts with alkali metals.

As specific examples of such water-soluble halogeno-1:3:5-triazines used in the process of the invention there may be mentioned 1-(4:6-dichloro-1:3:5-triazinylamino)-benzene-3-sulphonic acid,
2-(4:6-dichloro-1:3:5-triazinylamino)-naphthalene-6-sulphonic acid,
2-(4:6-dibromo-1:3:5-triazinylamino)-naphthalene-6-sulphonic acid,
1-(4:6-dichloro-1:3:5-triazinylamino)-8-hydroxynaphthalene-3:6-disulphonic acid,
1:4-bis-(4:6-dichloro-1:3:5-triazinylamino)-benzene-2-sulphonic acid,
1:3-bis-(4:6-dichloro-1:3:5-triazinylamino)-benzene-4-sulphonic acid,
1-(4:6-dichloro-1:3:5-triazinylamino)-benzene-4-carboxylic acid,
4-(4:6-dichloro-1:3:5-triazinylamino)-phenacyltrimethylammonium chloride,
3-(4:6-dichloro-1:3:5-triazinylamino)-phenyltrimethylammonium bromide,
1:4-bis-(4-chloro-6-methoxy-1:3:5-triazinylamino)-benzene-2-sulphonic acid and
6-chloro-2:4-bis-(2'-sulpho-4'-methylphenoxy)-1:3:5-triazine.

A preferred class of water-soluble halogeno-1:3:5-triazines for use in the process of the invention are water-soluble dyestuffs which contain a mono- or dihalogeno-1:3:5-triazinyl radical. Such water-soluble dyestuffs may be water-soluble nitro dyestuffs containing a mono- or dihalogeno-1:3:5-triazinyl radical or water-soluble dyestuffs of the azo, anthraquinone or phthalocyanine series containing a mono- or dihalogeno-1:3:5-triazinyl radical. Such water-soluble dyestuffs may be obtained as described in Examples 1 and 2 of British specification No. 209,723, Example 1 of British specification No. 298,484 and in British specifications Nos. 775,308, 772,030, 774,925, 780,591, 781,930, 784,221, 785,120 and 785,222.

When this preferred class of water-soluble halogeno-1:3:5-triazines is used in the process of the invention a resin finish is not only applied to the textile material but the textile material is simultaneously coloured in bright shades possessing excellent fastness to washing.

The water-soluble halogeno-1:3:5-triazines are effective at temperatures normally used in curing resin precondensates for example between 100° C. and 150° C., but exhibit no appreciable catalysis at normal temperatures.

The water-soluble halogeno-1:3:5-triazines may, in some instances, be used with advantage in conjunction with alkali metal thiocyanates, giving rise to greater resin retention and quicker curing rates than when using the water-soluble halogeno-1:3:5-triazine alone. Approximately one equivalent of the alkali metal thiocyanate is added to the aqueous solution for each halogen atom present in the mono- or di-halogeno-1:3:5-triazine.

The aqueous solutions used in the process of the invention may contain from between 3% and 30% and preferably between 5% and 20% of the resin-forming composition, as hereinbefore defined and between 0.1% and 5% and preferably between 0.5% and 2% of the water-soluble halogeno-1:3:5-triazine.

There may also be added to the aqueous solutions used in the process of the invention minor amounts of other known additives for example polyhydroxy compounds, e.g. polyvinyl alcohol, cellulose ethers, starches, starch ethers, proteinaceous materials such as casein and gelatin and/or surface-active agents.

The aqueous solution may be applied to the textile materials using any of the known methods, for example by padding.

The textile materials thus treated are then heated to a temperature between 100° C. and 150° C. for a period of between 1 minute and 15 minutes thereby effecting cure of the resin.

As examples of textile materials which are suitable for resin-treatment by the process of the invention there may be mentioned textile materials comprising natural fibres, for example cotton, wool and silk fibres, regenerated cellulose fibres for example viscose rayon fibres and synthetic fibres for example polyamide fibres. For instance, in the case of cellulosic fibres the aqueous solutions which may contain a resin-forming composition capable merely of polymerisation or, alternatively, of reaction with the fibre itself, may be used to provide a crease and/or shrink resistant finish or to render a mechanical finishing treatment, such as embossing, pleating and glazing, more durable to washing treatments. Such aqueous solutions, furthermore, when used to finish white cellulosic fibres give less loss in strength and yellowing on subsequent hypochlorite bleaching than occurs with the resin finished fabrics cured using conventional catalysts such as ammonium compounds. In the case of the synthetic fibres, the aqueous solutions may be used to modify the handle of the fibre. The aqueous solutions are characterised by their stability at normal application temperatures, i.e. 20°–40° C., remaining stable for several hours, thus enabling them to be continually used in textile processing. Furthermore, there is less likelihood of the textile materials possessing a residual odour when treated with the aqueous solutions than when treated with those containing ammonium compounds as catalysts.

The invention is illustrated but not limited by the following examples in which parts and percentages are by weight.

*Example 1*

Cotton cambric fabric is immersed in a solution of 10 parts of N:N'-dimethylolurea and 1 part of the sodium salt of 2-(4:6-dichloro-1:3:5-triazinylamino)-naphthalene-6-sulphonic acid in 89 parts of water. The fabric is squeezed until the amount of solution retained is 80% of the weight of the dry fabric and is then partially dried to approximately 10% moisture content. It is embossed by subjecting it to a high pressure for a period of 1 minute while mounted between two steel plates at a temperature of 150° C., the lower one of which has a flat surface while the upper one carries an embossed design. The fabric is then heated for 3 minutes at 150° C. The embossed finish thus produced possesses good durability to washing.

*Example 2*

A cotton cambric fabric is immersed in a solution of 10 parts of a melamine-formaldehyde precondensate and 1 part of the sodium salt of 2-(4:6-dichloro-1:3:5-triazinylamino)-naphthalene-6-sulphonic acid in 89 parts of water. The fabric is then squeezed until the amount of solution retained is 80% of the weight of the dry fabric and is then dried to a moisture content of about 10%. The fabric is glazed by passage twice through a calender at a temperature of 180° C. with friction followed by heating at 150° C. for 3 minutes. The resulting highly glazed finish has good durability to washing and dry cleaning treatments.

*Example 3*

A viscose rayon staple fibre fabric is immersed in a solution of 10 parts of N:N'-dimethylolethyleneurea and 1.2 parts of 4-(4:6-dichloro-1:3:5-triazinylamino)-phenacyl trimethylammonium chloride in 89 parts of water. The fabric, after being squeezed until the amount of solution retained is 100% of the weight of the dry fabric, is dried under tension so that the width remains unchanged. The fabric is then heated for 3 minutes at 150° C. After 10 washes in a rotary type washing machine the shrinkage of the treated fabric is 8% compared with 19% for the untreated fabric. The crease-resistance of the treated viscose is also considerably improved.

*Example 4*

A nylon twill fabric is immersed in a solution of 15 parts of a melamine-formaldehyde precondensate and 1.5 parts of the sodium salt of 2-(4:6-dichloro-1:3:5-triazinylamino)-naphthalene-6-sulphonic acid in 83.5 parts of water. The fabric is squeezed until the amount of solution retained by the fabric is 65% of the weight of the dry fabric and is dried at 50° C. The fabric is then heated for 3 minutes at 145° C. The fabric is thus given a stiff handle which possesses good durability to washing.

*Example 5*

By replacing the N:N'-dimethylol urea used in Example 1 by N:N'-dimethoxymethylurea and the sodium 2-(4:6-dichloro-1:3:5-triazinylamino)-naphthalene-6-sulphonate by 0.8 part of sodium 1-(4:6-dichloro-1:3:5-triazinylamino)benzene-3-sulphonate an embossed finish with good durability to washing can likewise be conferred on cotton.

*Example 6*

By replacing the melamine-formaldehyde precondensate used in Example 2 by 10 parts of N:N'-dimethyldimethyloladipamide and the sodium 2-(4:6-dichloro-1:3:5-triazinylamino)-naphthalene-6-sulphonate by 0.85 part of sodium 1-(4:6-dichloro-1:3:5-triazinylamino)benzene-3-sulphonate and carrying out the same series of operations a glazed finish is imparted to the cotton which also shows good durability to washing treatments.

*Example 7*

By replacing the N:N'-dimethylolethyleneurea used in Example 3 by 10 parts of dimethylolurea and the 4-(4:6-dichloro - 1:3:5 - triazinylamino)-phenacyltrimethylammonium chloride by 0.8 part of the sodium salt of 1:4-bis-(4:6-dichloro - 1:3:5 - triazinylamino)-benzene-3-sulphonic acid a viscose rayon staple fibre fabric is obtained which, after 10 laundry washes, shows a shrinkage of 8.2%. The untreated fabric shrinks by 19.2% when washed under the same conditions. The crease resistance of the fabric is also considerably improved by this treatment.

*Example 8*

By replacing the melamine-formaldehyde precondensate used in Example 2 by 10 parts of N:N'-dimethoxymethyluron and using 0.8 part of the sodium salt of 2-(4:6-dichloro-1:3:5-triazinylamino) - naphthalene - 6-sulphonic acid a glazed finish of good durability to washing is conferred on the cotton.

*Example 9*

A cotton cambric fabric is immersed in a solution of 10 parts of a melamine-formaldehyde precondensate, 0.6 part of the sodium salt of 2-(4:6-dichloro-1:3:5-triazinylamino)-naphthalene-6-sulphonic acid and 0.3 part of potassium thiocyanate in 89 parts of water. The fabric is squeezed until the amount of solution retained is 80% of the weight of the dry fabric and is then dried to a moisture content of approximately 10%. It is embossed by subjecting it to a high pressure for 1 minute while mounted between two steel plates at 150° C., the lower one of which has a flat surface while the upper one carries an embossed design. The fabric is then heated at 150° C. for 3 minutes. The embossed finish produced has good fastness to washing.

*Example 10*

A cotton cambric fabric is impregnated with a composition comprising 10 parts of a melamine-formaldehyde precondensate, 1 part of the sodium salt of 1-(2:4-dichloro-1:3:5-triazinylamino)-benzene - 4 - carboxylic acid and 89 parts of water. It is dried to a moisture content of about 10% and is embossed as described in Example 1. The fabric is then heated for 3 minutes at 150° C. The resulting embossed finish possesses good durability to washing.

*Example 11*

If, in the preceding example, 1 part of the sodium salt of 1-(2:4-dichloro-1:3:5-triazinylamino)-benzene-4-carboxylic acid is replaced by a mixture of 0.8 part of the latter triazine and 0.4 part of potassium thiocyanate a similar effect is obtained.

*Example 12*

If in Example 10, the melamine-formaldehyde precondensate is replaced by an equal weight of N:N'-dimethoxymethylurea and the sodium-(2:4-dichloro-1:3:5-triazinylamino)-benzene-4-carboxylate is replaced by 1.2 parts of 6-chloro-2:4-bis-(2'-sulpho-4'-methylphenoxy)-1:3:5-triazine the resulting embossed finish likewise possesses durability to washing.

*Example 13*

By replacing the melamine-formaldehyde precondensate used in Example 10 by an equal weight of N:N'-dimethylolethyleneurea and the sodium 1-(2:4-dichloro-1:3:5-triazinylamino)-benzene-4-carboxylate by 1.3 parts of the sodium salt of 1-amino-4-[4-(4:6-dichloro-1:3:5-triazinylamino) - 3 - sulphoanilino]-anthraquinone-2:5-disulphonic acid a coloured finish possessing durability to washing is obtained.

*Example 14*

By replacing the 1.2 parts of 4-(4:6-dichloro-1:3:5-triazinylamino)-phenacyltrimethylammonium chloride used in Example 3 by 1 part of the sodium salt of 1:4-bis-(4-chloro-6-methoxy - 1:3:5 - triazinylamino) - benzene-2-sulphonic acid a similar anti-crease and anti-shrink finish is obtained.

*Example 15*

A cotton cambric fabric is immersed in a solution of 10 parts of a melamine-formaldehyde precondensate, 0.8 part of sodium 2-(4:6-dichloro-1:3:5-triazinylamino)-naphthalene-6-sulphonate and 0.8 part of the dyestuff of Example 1 of British specification No. 774,925 in 88.4 parts of water. The fabric is squeezed between rollers so that the uptake of the solution is 80% of the dry weight of the fabric and is air-dried to approximately 10% moisture content. It is then embossed by the procedure of Example 1 and heated at 150° C. for 3 minutes.

The treated fabric possesses good fastness both of colour and finish on being washed in alkaline liquors.

*Example 16*

If in Example 1, the N:N'-dimethylolurea is replaced by an equal weight of N:N'-dimethoxymethyladipamide and the sodium 2-(4:6-dichloro-1:3:5-triazinylamino)-naphthalene-6-sulphonate by 1.2 parts of sodium β-(N-methyl-N-4:6-dichloro-1:3:5-triazinyl)-aminoethene sulphonate an embossed finish of good durability to washing is likewise conferred on the cotton.

What I claim is:

1. A process for the simultaneous resin treatment and colouration of textile materials which comprises treating the textile materials with an aqueous solution containing as the essential ingredients a resin-forming composition selected from the group consisting of amine- and amido-group containing water-soluble and water-dispersable resin-forming compositions, and a water-soluble dyestuff containing a C-halogeno-1:3:5-triazine radical as a latent curing catalyst.

2. Process according to claim 1 wherein said aqueous solution contains between 3% and 30% of the said resin-forming composition and between 0.1% and 5% of the said catalyst, said solution is applied to the textile material by padding the same, and after such treatment the textile materials are heated to a temperature between 100° C. and 150° C for a required period of time of between 1 minute and 15 minutes.

3. Process according to claim 1 wherein the resin-forming composition selected from the group consisting of methylol derivatives and lower alkyl ethers of methylol derivatives of monomeric and polymeric compounds containing amino groups selected from the class consisting of primary and secondary amino groups.

4. Process according to claim 1 wherein an alkali metal thiocyanate is added to the aqueous solution of the resin-forming composition and the water-soluble C-halogeno-1:3:5-triazine.

References Cited in the file of this patent

UNITED STATES PATENTS

| 2,339,203 | Stiegler | Jan. 11, 1944 |
| 2,357,273 | Thurston | Aug. 29, 1944 |
| 2,573,525 | West | Oct. 30, 1951 |
| 2,654,720 | Cohen et al. | Oct. 6, 1953 |
| 2,739,908 | Marsh | Mar. 27, 1956 |
| 2,892,830 | Stephen | June 30, 1959 |

FOREIGN PATENTS

| 772,030 | Great Britain | Apr. 10, 1957 |

OTHER REFERENCES

Ser. No. 233,292, Schubert et al. (A.P.C.), published May 4, 1943.